(12) United States Patent
Wong et al.

(10) Patent No.: US 6,390,783 B1
(45) Date of Patent: May 21, 2002

(54) HYDRAULIC PUMP HAVING LOW AERATION SINGLE RETURN BOOST RESERVOIR

(75) Inventors: Albert Cheuk-Yin Wong; Tom Cheuk-In Wong, both of Saginaw; Johnny M. Paris, Clio, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 125 days.

(21) Appl. No.: 09/625,104

(22) Filed: Jul. 25, 2000

Related U.S. Application Data
(60) Provisional application No. 60/178,655, filed on Jan. 28, 2000.

(51) Int. Cl.[7] .................................................. F04B 19/24
(52) U.S. Cl. ......................................................... 417/53
(58) Field of Search ............................... 417/53, 77, 80, 417/87, 88, 89, 198

(56) References Cited

U.S. PATENT DOCUMENTS 4,386,891 A    6/1983  Riefel et al. .................. 408/81
5,458,467 A  * 10/1995  Yuhasz ......................... 417/83
5,802,848 A  *  9/1998  McClendon et al. .......... 60/426
5,943,861 A  *  8/1999  Davison et al. ............... 60/453

* cited by examiner

Primary Examiner—Charles G. Freay
Assistant Examiner—William Rodriguez
(74) Attorney, Agent, or Firm—Edmund P. Anderson

(57) ABSTRACT

The fluid reservoir of a hydraulic system is fitted with a nozzle having a constricted primary discharge opening for directing an accelerated jet stream of hydraulic fluid returned to the reservoir from a pump back to an inlet of the pump. The jet stream aspirates additional fluid from the reservoir to boost the supply to the pump to minimize cavitation for quiet operation. The nozzle includes at least one bleed hole located upstream of the primary discharge opening through which a fraction of the fluid stream escapes into the reservoir and is permitted to dwell for a time sufficient to allow natural separation of entrained gas from the fractional stream before being drawn into the reservoir outlet by the jet stream.

13 Claims, 8 Drawing Sheets

HYDRAULIC PUMP HAVING LOW AERATION SINGLE RETURN BOOST RESERVOIR

This application claims the benefit of provisional application 60/178,655 filed Jan. 28, 2000.

TECHNICAL FIELD

This invention relates to hydraulic pumps and more particularly to the means of handling of the fluid returned to the hydraulic reservoir used to feed the pump under high flow, high pressure conditions with low noise.

BACKGROUND OF THE INVENTION

Fixed and/or variable positive displacement hydraulic pumps have numerous applications in many fields, including automotive, aerospace, industrial, agricultural, heavy equipment and the like for performing work. In a typical hydraulic system, return fluid is simply returned into the pump reservoir where it dwells for a time period before being drawn in by the inlet to the pump for recirculation. Under conditions of high load and high flow rate, such hydraulic systems are characteristically unable to keep up with the fluid demand of the pump, leading to cavitation and unacceptable levels of noise. Another inherent disadvantage with such systems is that the kinetic energy of the incoming fluid to the reservoir is lost and not utilized to feed the inlet to the pump, leading to relatively low efficiencies. Such simple single return hydraulic fluid return systems thus have their limits.

U.S. Pat. No. 5,802,848 discloses a hydraulic steering system for a motor vehicle having two separate fluid return lines leading to the reservoir. One line is a high return flow which is fed to a nozzle within the reservoir. The outlet of the nozzle is supported adjacent the inlet to the steering pump. The momentum of the return fluid exiting the nozzle creates a venturi action at the reservoir outlet, which has the beneficial effect of aspirating additional volumes of fluid from the reservoir. The momentum of the return fluid together with the addition of the entrained fluid from the reservoir produces a desirable "boost" effect which provides ample feed to the pump under conditions of high flow and high pressure to prevent cavitation attributable to lack of sufficient inflow to the pump. The second return line delivers a fraction of the return fluid to the reservoir. Such fluid is permitted to dwell for a time in the reservoir chamber, during which time any undissolved air or gas bubbles contained in the secondary stream are liberated before the fluid is drawn in by the primary jet stream. Without the secondary return line, the fluid would not be sufficiently deaerated and cavitation and noise would result.

One inherent limitation of the above system is that it requires two separate return lines to the reservoir, and thus may not be suitable for all pump applications, and particularly those having only a single high flow return line. The requirement of the secondary line further adds cost, weight and complexity to the construction of the system and particularly the reservoir.

SUMMARY OF THE INVENTION

A hydraulic system according to the invention includes a hydraulic pump reservoir having a fluid outlet communicating with the inlet to the pump, a single fluid return line having a nozzle within the reservoir adjacent the outlet and operative to direct a high velocity jet flow of fluid from the single return line into the outlet and to thereby aspirate additional volumes of fluid into the inlet to achieve high flow, high pressure operation of the pump. According to a characterizing feature of the invention, the nozzle includes at least one bleed hole through which a fraction of the fluid flow escapes into the reservoir at a location upstream of the nozzle outlet and dwells for a time sufficient to liberate any entrained air or gas bubbles before being drawn into to the pump by the primary flow stream.

The invention has the advantage of achieving, with a single return line, high velocity, high flow delivery of fluid to the pump while deaerating the fluid to minimize cavitation and noise.

The invention has the further advantage of being readily adaptable to any hydraulic pump system calling for high velocity, high flow delivery of fluid to the pump with low noise, whether the system has a single or multiple return lines. According to the invention, multiple return lines can be converged upstream of the reservoir to provide a single high flow return line leading to the reservoir. Some of the systems contemplated by the invention include, but are not limited to vehicular power steering, transmission, and engine oil applications; industrial; construction; heavy equipment; aerospace, etc.

The invention has the further advantage of eliminating the need and thus cost and added weight of a secondary flow return line, as is necessary with system of the above-mentioned '848 prior patent.

BRIEF DESCRIPTION OF THE DRAWINGS

Presently preferred embodiments of the invention are disclosed in the following description and in the accompanying drawings, wherein.

DETAILED DESCRIPTION OF THE PREFERRED EMBODIMENTS

Figure 1:
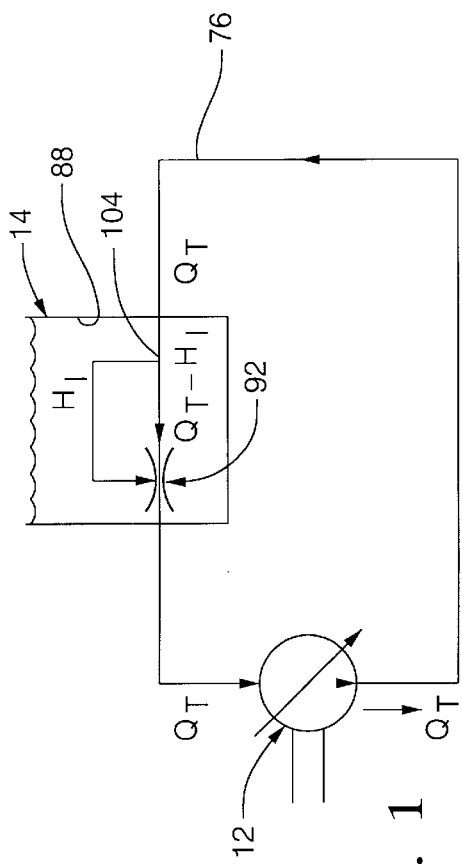
FIG. 1 is a schematic diagram of a general hydraulic system according to the invention.

Referring to FIG. 1, a schematically represented hydraulic system 10 is shown having a pump 12 and a reservoir 14 having a single return line 76 leading from the pump 12 to the reservoir 14. The pump 12 may comprise any positive fixed or variable displacement hydraulic pump including motor vehicle steering pumps, oil pumps, transmission pumps, as well as hydraulic pumps used in industrial, agricultural, heavy equipment, rail and aerospace applications, to name a few. The booster reservoir 14 of the invention is thus applicable to working in conjunction with virtually any positive displacement hydraulic pump to achieve high rpm, high displacement and high flow without cavitation and noise. As will become apparent from the description below, the adaptation of the booster reservoir 14 is not limited to pumps having multiple fluid return lines leading to the reservoir, such as is necessary for operation of the return booster reservoir in U.S. Pat. No. 5,802,848. The hydraulic booster reservoir 14 of the present invention operates on and requires only a single return line, which accounts for its ready adaption to virtually any hydraulic pump system, regardless of the number of return lines.

Figure 2:
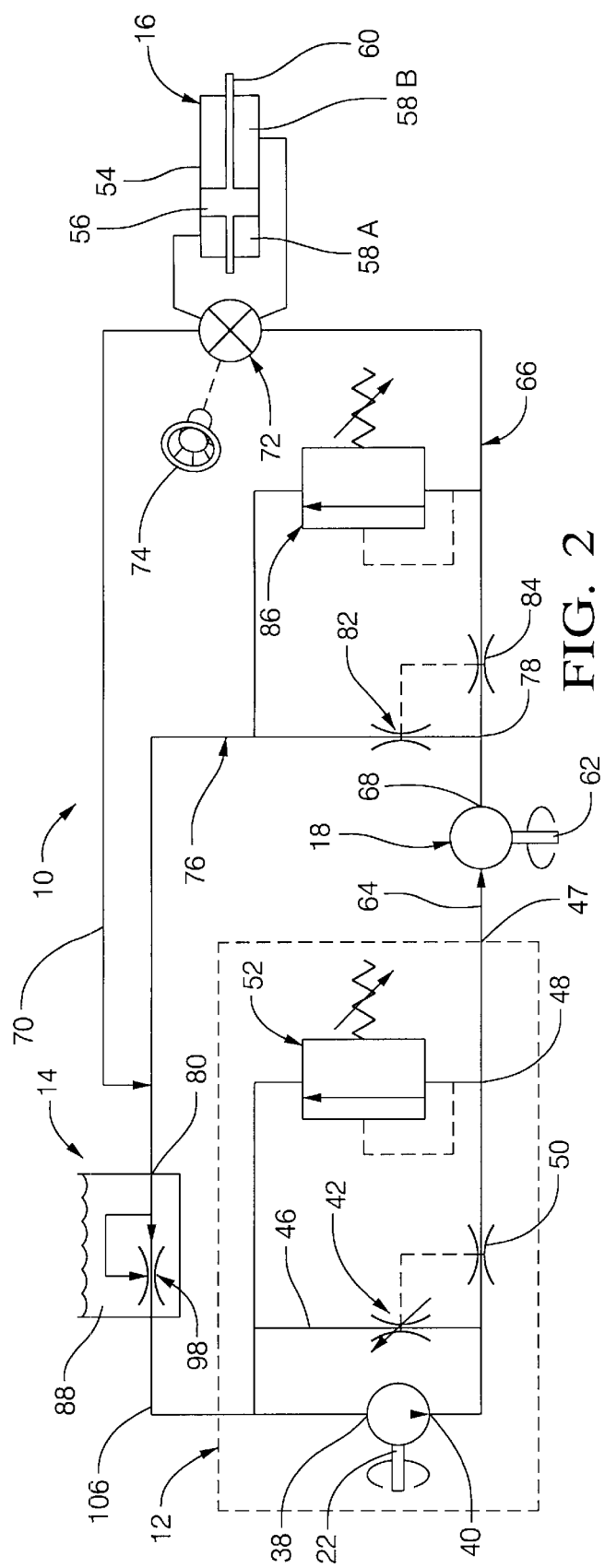
FIG. 2 is a schematic diagram of a particular hydraulic system according to the invention.

FIG. 2 illustrates a schematic diagram of a particular motor vehicle hydraulic system 10 which embodies the subject single return booster reservoir 14 of the invention. The system 10 of FIG. 2 comprises the system disclosed in the aforementioned U.S. Pat. No. 5,802,848, incorporated herein by reference, but modified to include the single return line boost reservoir 14. Briefly, it will be seen that the slow flow return line 66 no longer extends directly into the reservoir 14 for purposes of deaerating a fraction of the flow, but rather is merged with the high flow return line 76 to provide a single line leading into the reservoir 14 which serves both to feed the pump 12 with a high velocity jet of hydraulic fluid and to deaerate a fraction of the flow within the reservoir 14 as will be described below.

Figure 3:
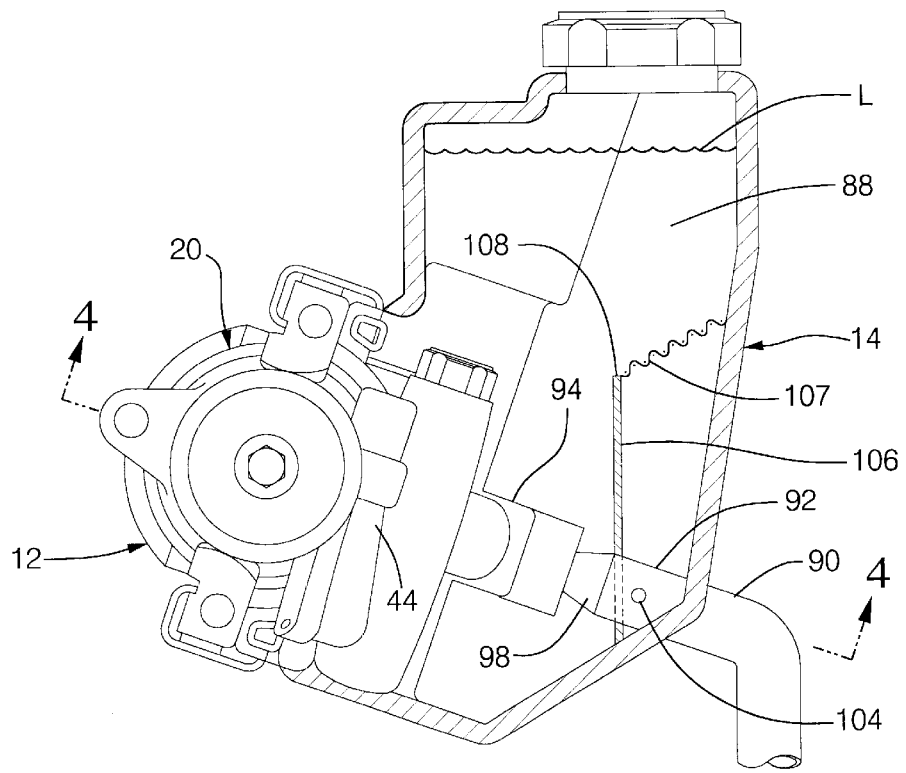
FIG. 3 is an elevation view, shown partly in section, of a hydraulic pump fitted with an integrated booster reservoir according to the invention.
Figure 4:
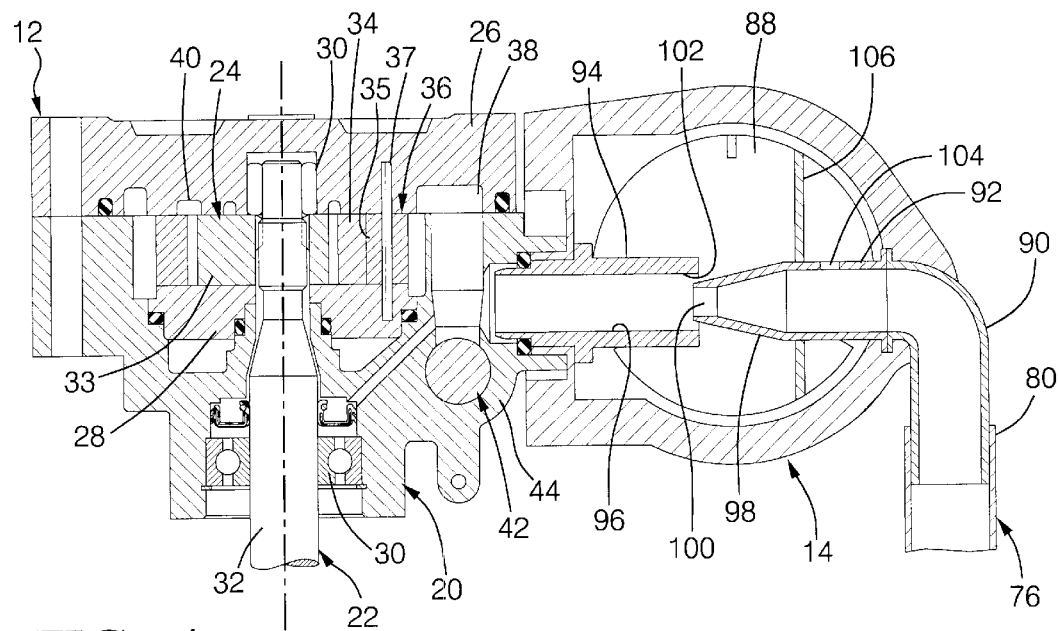
FIG. 4 is a sectional view taken generally along lines 4—4 of FIG. 3.

Referring to FIGS. 2–4, the illustrated pump 12 of the particular hydraulic system comprises a power steering pump having a stationary housing 20, an input shaft 22 rotatably supported on the stationary housing 20, and a rotating group 24 between a non-rotating thrust plate 26 on the housing and non-rotating pressure plate 28 on the housing. The input shaft 22 is rotatably supported on the housing 20 and the pressure plate 26 by a pair of bearings 30. An end 32 of the input shaft 22 outside of the stationary housing 20 is connected to a motor (not shown) of the vehicle such that the speed of the pump, i.e., the revolutions per minute (RPM's) of the input shaft 22, is proportional to the RPM's of an element, e.g., a crankshaft, of the motor.

The rotating group 24 of the power steering pump 12 includes a rotor 33 rigidly attached to the input shaft 22 for rotation therewith and a plurality of radially slideable vanes 34 on the rotor 33 which cooperate with a cam surface 35 on a cam ring 36 non-rotatably secured to the housing 20 around the rotor by a plurality of dowel pins 37 (only one visible in FIG. 4), and with the pressure plate 28 and the thrust plate 26 defining a plurality of pump chambers (not shown) which expand and collapse as the rotor rotates with the input shaft 22. The expanding pump chambers sweep past a fragmentarily illustrated inlet port 38 of the power steering pump and the thrust plate 26. The collapsing pump chambers sweep past a fragmentarily illustrated discharge port 40 of the pump 12 and the thrust plate 26. For a more complete description of the structure and operation of the power steering pump 12, reference may be made to U.S. Pat. No. 4,386,891 the disclosure of which is incorporated herein by reference.

Still referring to the particular hydraulic steering system embodiment of FIG. 2, the pump 12 further includes a schematically represented internal control valve 42 which, as illustrated in FIG. 4, is supported in a cylindrical boss 44 of the housing 20. As described fully in the aforementioned U.S. Pat. No. 4,386,891, the flow control valve 42 is disposed in an internal recirculation passage 46 in the stationary housing 20 between the discharge port 40 and the inlet port 38. When the flow control valve 42 is closed, all of the fluid expelled into the discharge port 40 is discharged from the power steering pump 12 through a schematically represented high pressure port 47 of the power steering pump connected to the discharge port through an internal branch 48 of the recirculating passage 46. The flow control valve 42 transitions progressively from closed to fully opened in response to an increasing pressure gradient across a restriction 50 in the internal branch 48. As the flow control valve 42 opens, progressively more fluid recirculates from the discharge port 40 directly to the inlet port 38 to maintain the flow rate from the high pressure port 47 of the power steering pump substantially constant and to induce subatmospheric pressure at the inlet port 38 to suppress cavitation. When the flow control valve is closed, there is no recirculation to suppress cavitation. A schematically represented internal pressure relief valve 52 of the power steering pump opens only in extraordinary circumstances.

The illustrated system 10 of the FIG. 2 embodiment includes a steering assist fluid motor 16 which may be an element of a motor vehicle rack and pinion power steering gear such as described in U.S. Pat. No. 4,454,801. The motor 16 includes a stationary cylinder 54, a piston 56 dividing the cylinder into a pair of working chambers 58a, 58b, and a rod 60 rigidly attached to the piston and linked to dirigible wheels, not shown, of the motor vehicle such that back and forth linear translation of the rod steers the dirigible wheels. The second fluid motor 18 may have any conventional construction and includes a rotatable output shaft 62 adapted for driving connection to an accessory of the motor vehicle such as a radiator cooling fan. The second fluid motor 18 is disposed in a fluid conduit 64 of the hydraulic system 10 through which flows all of the fluid discharged by the power steering pump 12 through the high pressure port 46 thereof and from which fluid energy is extracted to rotate the output shaft 62.

As further seen in FIG. 2, a second fluid conduit 66 has an upstream end 68 at the second fluid motor 18 and a downstream end 70. A schematically represented proportional control valve 72 for the steering assist motor 16 is disposed in the second fluid conduit 66 and may have the construction described in the U.S. Pat. No. 4,454,801. In the absence of manual effort at a steering hand wheel 74 of the motor vehicle connected to the proportional control valve 72, fluid in the second conduit 66 flows with little restriction through the valve. When manual effort is applied to the steering handwheel 74, the proportional control valve 72 throttles fluid flow in the second conduit 66 to create a steering assist boost pressure and directs the boost pressure to one of the working chambers 58a, 58b of steering assist fluid motor while as the same time maintaining a connection between the other of the working chambers 58a, 58b and a second conduit 66 downstream of the flow control valve.

A third fluid conduit 76 of the hydraulic system 10 has an upstream end 78 connected to the second fluid conduit 66 between the second fluid motor 18 and the proportional control valve 72 and a downstream end 80 at the reservoir 14. A flow control valve 82 of the hydraulic system 10 remote from the power steering pump 12 transitions progressively from closed to filly opened in response to an increasing pressure gradient across a restriction 84 in the second fluid conduit 66 downstream of the third fluid conduit 76. As the remote flow control valve 82 opens, progressively more fluid bypasses the proportional control valve 72 and flows toward the reservoir 14 through the third fluid conduit 76. A schematically represented pressure relief valve 86 parallel to the remote flow control valve 82 limits the maximum fluid pressure in the second fluid conduit 66 downstream of the third fluid conduit 76 and opens only in extraordinary circumstances. The fluid flow in the conduit 64 through the second motor 18 consists of the total flow discharged from the power steering pump 12 through the high pressure port 46 thereof. The remote flow control valve 82 is calibrated to divide the fluid flow from the conduit 64 into a constant flow rate fraction in the second fluid conduit 66 downstream of the third fluid conduit 76 and a variable flow rate fraction in the third fluid conduit 76. The fluid flow rate of the constant flow rate fraction is consistent with the flow requirements of the steering assist fluid motor 16 and is typically about 2.6 gallons per minute. The fluid flow rate of the variable flow rate fraction is constituted by the remainder of the fluid from the high pressure port of the power steering pump and varies with the speed of the input shaft 22 of the power steering pump in the range of input shaft speed when the internal flow control valve 42 of the power steering pump is closed. The fluid flow rate of the variable flow rate fraction typically may range between about 2.6 gallons per minute and 15 gallons per minute. Because the constant flow rate fraction is always substantially less than the variable flow rate fraction, the second conduit 66 constitutes a low flow branch of the hydraulic system 10 and the third conduit 76 constitutes a high flow branch of the hydraulic system.

As illustrated in FIG. 2, the schematically illustrated vehicle hydraulic system 10 differs from that disclosed in U.S. Pat. No. 5,802,848 in that the downstream end 70 of the second fluid conduit 66 does not extend directly into the reservoir 14, but joins the downstream end 80 of the third fluid conduit 76 such that only a single, high flow line enters the reservoir 14. In other words, the multi-return line hydraulic system of U.S. Pat. No. 5,802,848 has been modified according to the invention and as illustrated in FIG. 2 to provide a single, high flow return line 76 to the reservoir 14, effectively eliminating the need for a low flow return line into the reservoir 14.

As seen best in FIGS. 3 and 4, the downstream end 80 of the single fluid return line 76 extends into and communicates with an internal chamber 88 through a tubular fitting 90 of the reservoir 14 coupled to a flow-restricting nozzle 92 disposed within the chamber 88 well below the level L of the fluid within the chamber 88. A fluid discharge tube 94 is submerged in the fluid in the chamber 88 and has a passage 96 therein defining an outlet of the reservoir 14 in flow communication with the inlet 38 of the pump 12, such that fluid passing through outlet 96 is fed to the pump 12.

The nozzle 92 comprises an elongate tubular member having a fluid-constricting reduced diameter discharge end 98 defining a constricted primary discharge opening 100 in the end thereof communicating with a receiving end 102 of the discharge tube 94. In the illustrated embodiment, the nozzle 92 and discharge tube 94 are coaxial, although such is not necessary so long as the fluid expelled from the nozzle end 98 is directed into the receiving end 102 of the discharge tube 94.

Upstream of the discharge end 98 of the nozzle 92 there is provided at least one bleed opening 104 through which a fraction of the flow of fluid through the nozzle is discharged into the chamber 88 at a location remote from the receiving end 102 of the discharge tube 94.

In operation, the high velocity fluid entering the nozzle 92 through the single return line 76 is constricted at the discharge end 98, developing a back pressure within the nozzle 92 which forces a fraction of the flow out of the nozzle 92 through the bleed opening104. The fraction of fluid escaping the bleed port 104 is preferably kept low, on the order of about 2–10% and preferably around 5% of the flow, with the remainder passing through the discharge end 98 and into the discharge tube 94 where it develops a venturi effect producing a negative atmospheric pressure at the receiving end 102 serving to aspirate or draw additional quantities of fluid from the chamber 88 into the discharge tube 94 to effectively boost the inflow of fluid to the pump 12. For further discussion of the boost effect, reference may be had to the aforementioned U.S. Pat. No. 5,802,848.

The small fraction of the fluid flow exiting the bleed port 104 is permitted to dwell for a period within the chamber 88 during which time any entrained gas bubbles are permitted to rise to the surface of the fluid before such fluid is aspirated from the chamber 88 into the discharge tube 94 by the jet stream of return fluid exiting the discharge end 98 of the nozzle 92. Over time, all of the fluid in the closed system will eventually be discharged through the bleed opening 104 and thus will become deaerated, which has the effect of maintaining the fluid in a substantially deaerated condition to inhibit cavitation which might otherwise result from the feeding of such aerated fluid to the pump 12.

In order to assure that aerated fluid exiting the bleed port 104 has sufficient dwell time before being aspirated into the discharge tube 94, a partition or baffle 106 is provided to form.a barrier between the bleed port 104 and the receiving end 102 of the tube 94 to prevent the direct flow of the fluid from the bleed port 104 into the tube 94. The baffle 106 extends at least partially about the nozzle 92 at a location forwardly or downstream with respect to the main fluid flow of the bleed opening 104. The baffle 106 extends a distance upwardly in the chamber terminating at a free edge 108 below the level L of the fluid within the chamber 88. As illustrated in FIG. 4, the baffle 106 can extend widthwise across the chamber 88. The baffle 106 thus partitions the chamber 88 preventing the fraction of fluid exiting the bleed opening 104 from being drawn into the discharge tube 94 until such time as it makes its way around the baffle 106. The size, location and configuration of the baffle 106 can be adjusted as necessary depending on the conditions of the particular system in which the reservoir 14 is operating. For example, systems in which the hydraulic fluid is prone to high levels of aeration may require a full width, tall baffle 106 to increase the dwell time of the fluid exiting the bleed hole 104. A fluid-pervious screen 107 may be provided across the partitioned region of the chamber 88 submerged in the fluid in such position that the hydraulic fluid passing up and over the baffle 106 is caused to pass through the screen 107. Small gas bubbles in the rising fluid encounter the collect on the screen 107, causing them to coalesce to form larger air bubbles that rise to the surface of the fluid more rapidly and efficiently.

Figure 5:
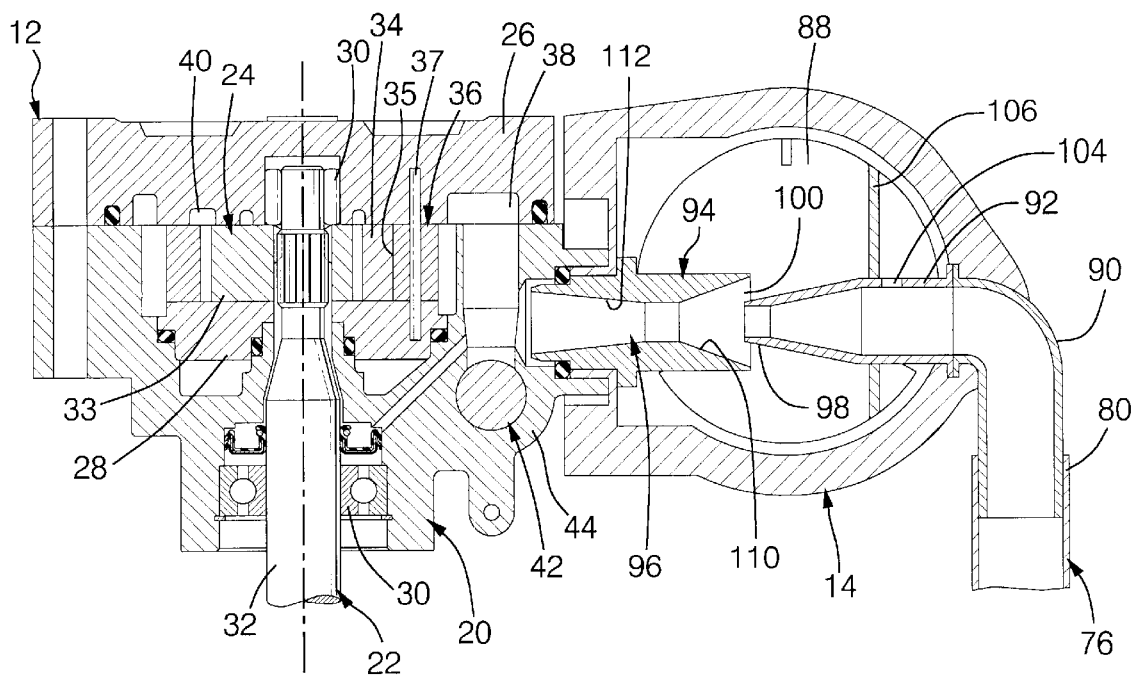
FIG. 5 is a view like FIG. 4 showing a modified intake throat of the pump.

FIG. 5 is an alternative embodiment of the reservoir which is identical to that of FIGS. 3 and 4 except that the passage 96 of the discharge tube 94 has a convergent portion 110 at the receiving end 102 and a divergent portion 112 at the opposite end in order to alter the flow characteristics through the discharge tube 94, if necessary, to achieve the desired aspiration of the fluid in the chamber 88.

Figure 6:
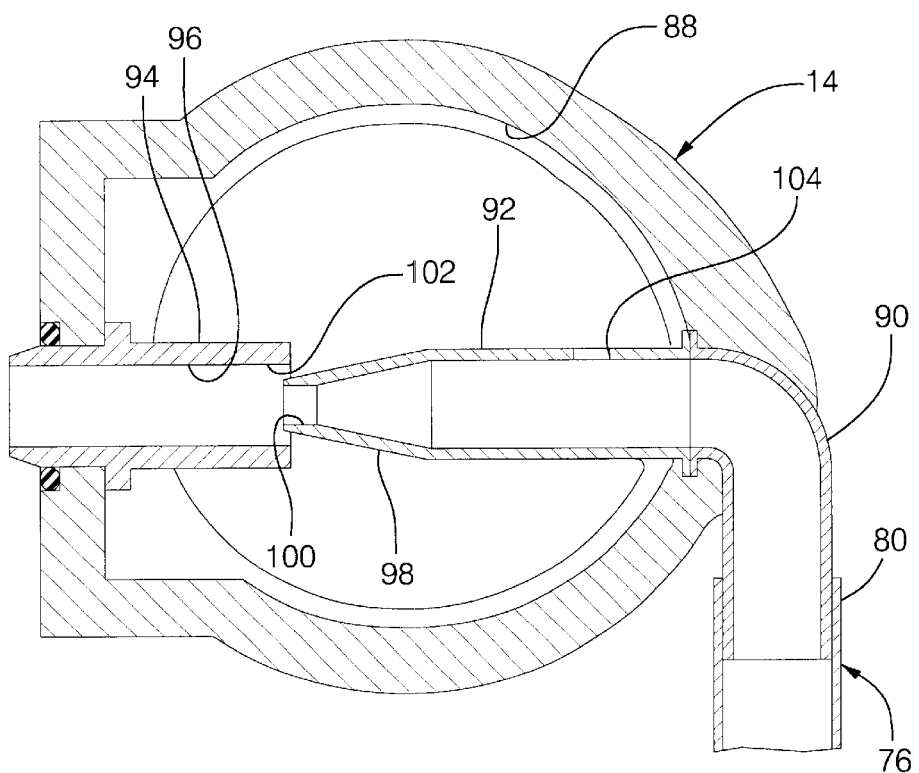
FIG. 6 is a fragmentary sectional view illustrating an alternative nozzle construction.

FIG. 6 shows still a further embodiment wherein the baffle 106 of the previous embodiment is eliminated. In the FIG. 6 embodiment, the chamber 88 is configured to accommodate a nozzle 92 of sufficient length to permit the bleed hole 104 to be located a sufficient distance from the fluid outlet (i.e., beyond the aspiration zone of the receiving end 102 of the discharge tube 94), eliminating the need for the baffle 106.

Figure 7:
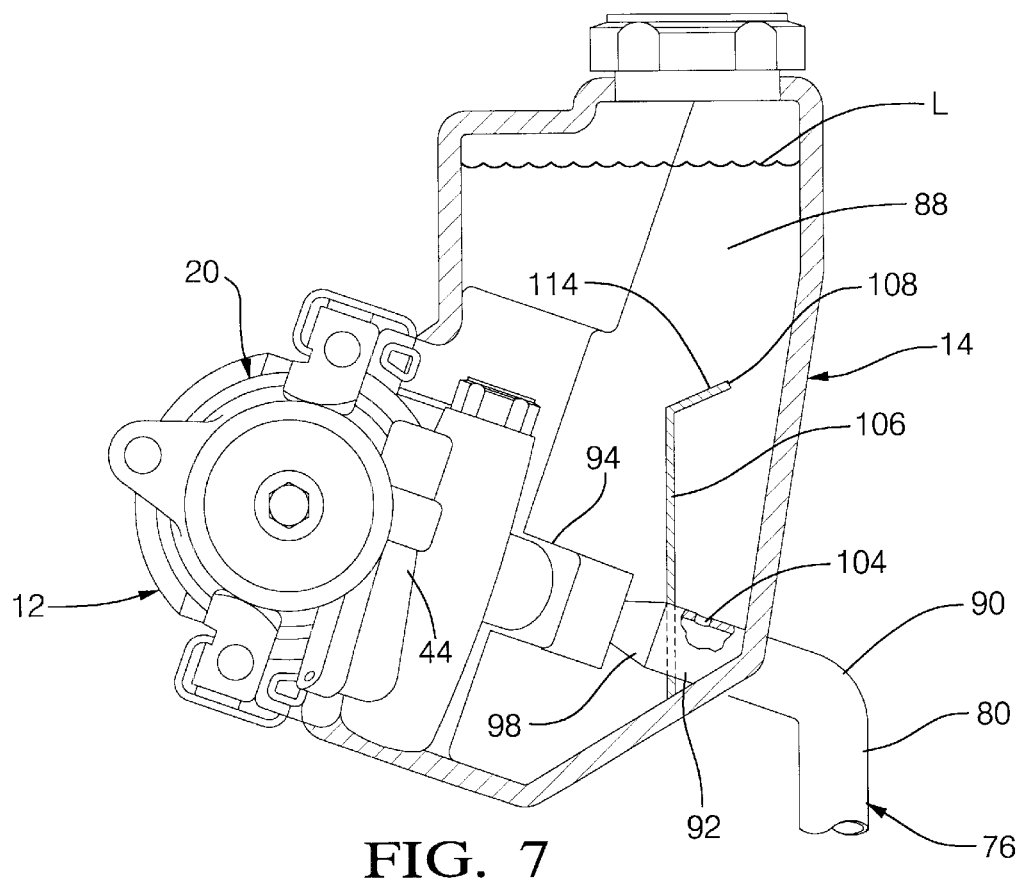
FIG. 7 is a view like FIG. 3 but showing a modified bleed hole and baffle arrangement.

FIG. 7 is the same as the embodiment of FIGS. 3 and 4, except that the bleed opening 104 is directed upwardly rather than to the side in the chamber 88. In such case, it may be desirable to provide a deflector 114 on the baffle 106 to restrict the upward flow of the fluid exiting the bleed opening 104.

Figure 8:
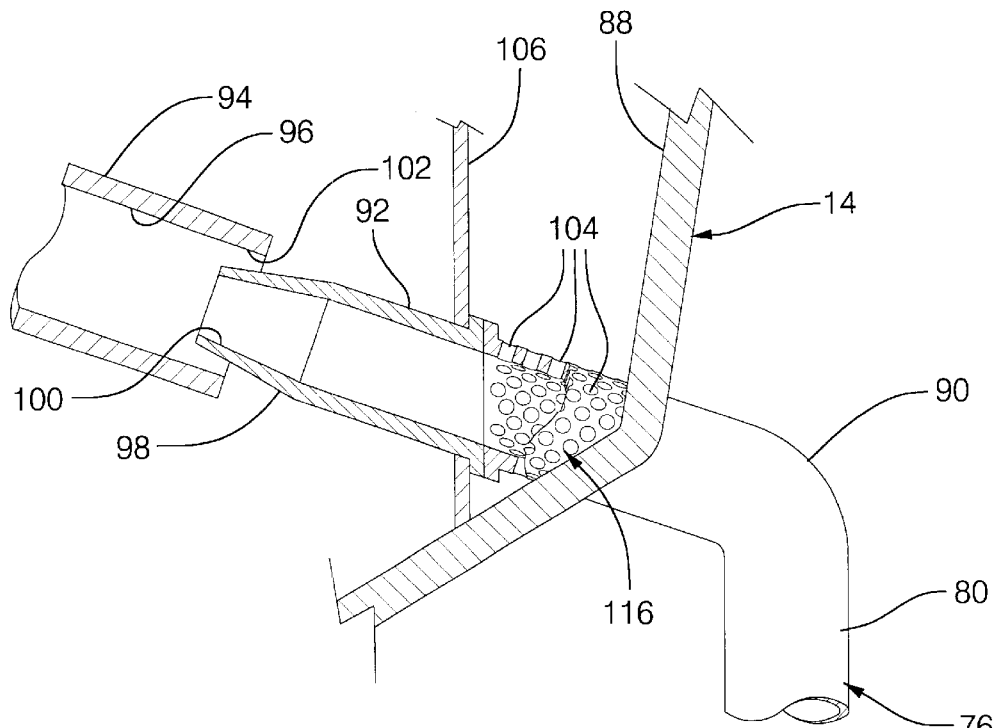
FIG. 8 is an enlarged fragmentary sectional view showing a further alternative construction of the nozzle.

FIG. 8 shows a further embodiment which is like that of the FIGS. 3 and 4 embodiment, except that the nozzle 92 is provided with a porous section 116 in lieu of a single of multiple bleed hole 104. The porous section 116 may comprise formed rigid plastic, wove porous tubing of metal or plastics, a perforated metal or plastic tube, etc. providing numerous small openings 104 through which the fluid can flow.

Figure 9:
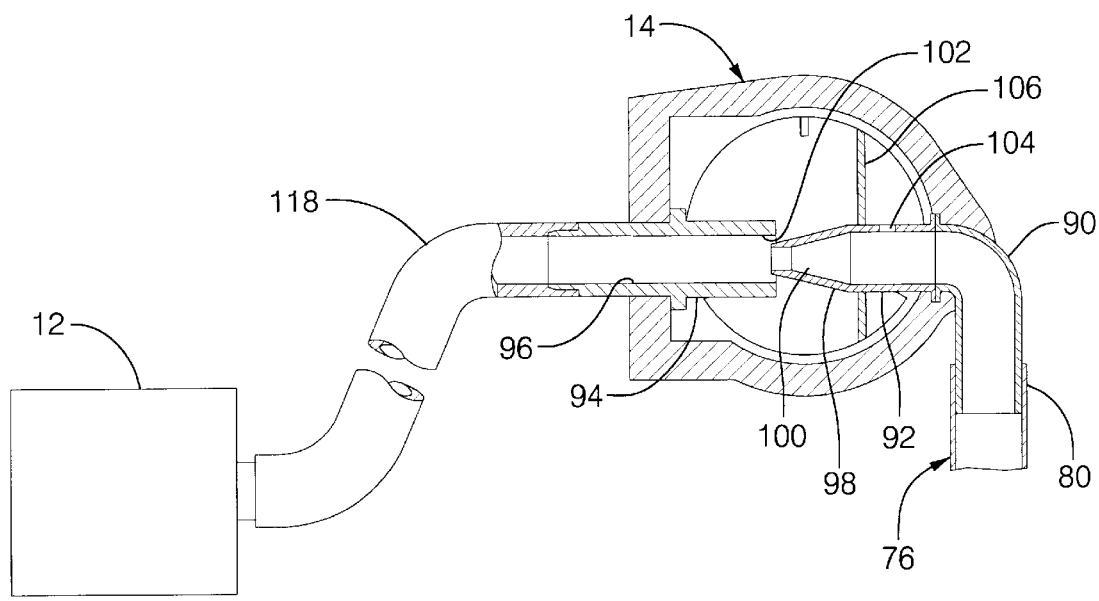
FIG. 9 is a schematic, partly sectional view of a hydraulic pump and remote booster reservoir according to the invention.

FIG. 9 illustrates still a further embodiment in which the reservoir 14 may be constructed and operates in the same manner as any of the embodiments described above, but is remote from the pump 12 rather than being integral therewith. The remotely situated reservoir 14 of FIG. 9 may be coupled by an appropriate fluid line 118 extending from the discharge tube 94 to the intake of the pump 12.

Figure 10:
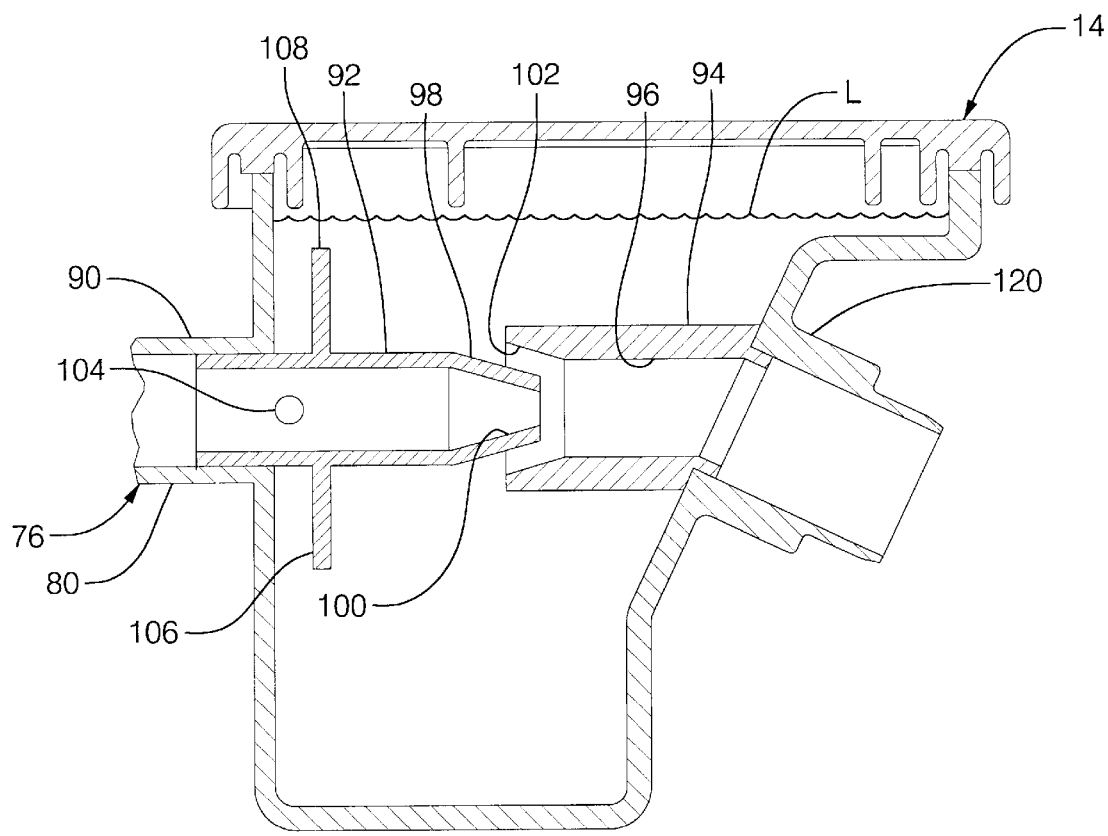
FIG. 10 is a fragmentary sectioned elevational view of an alternative construction of a booster reservoir according to the invention.
Figure 11:
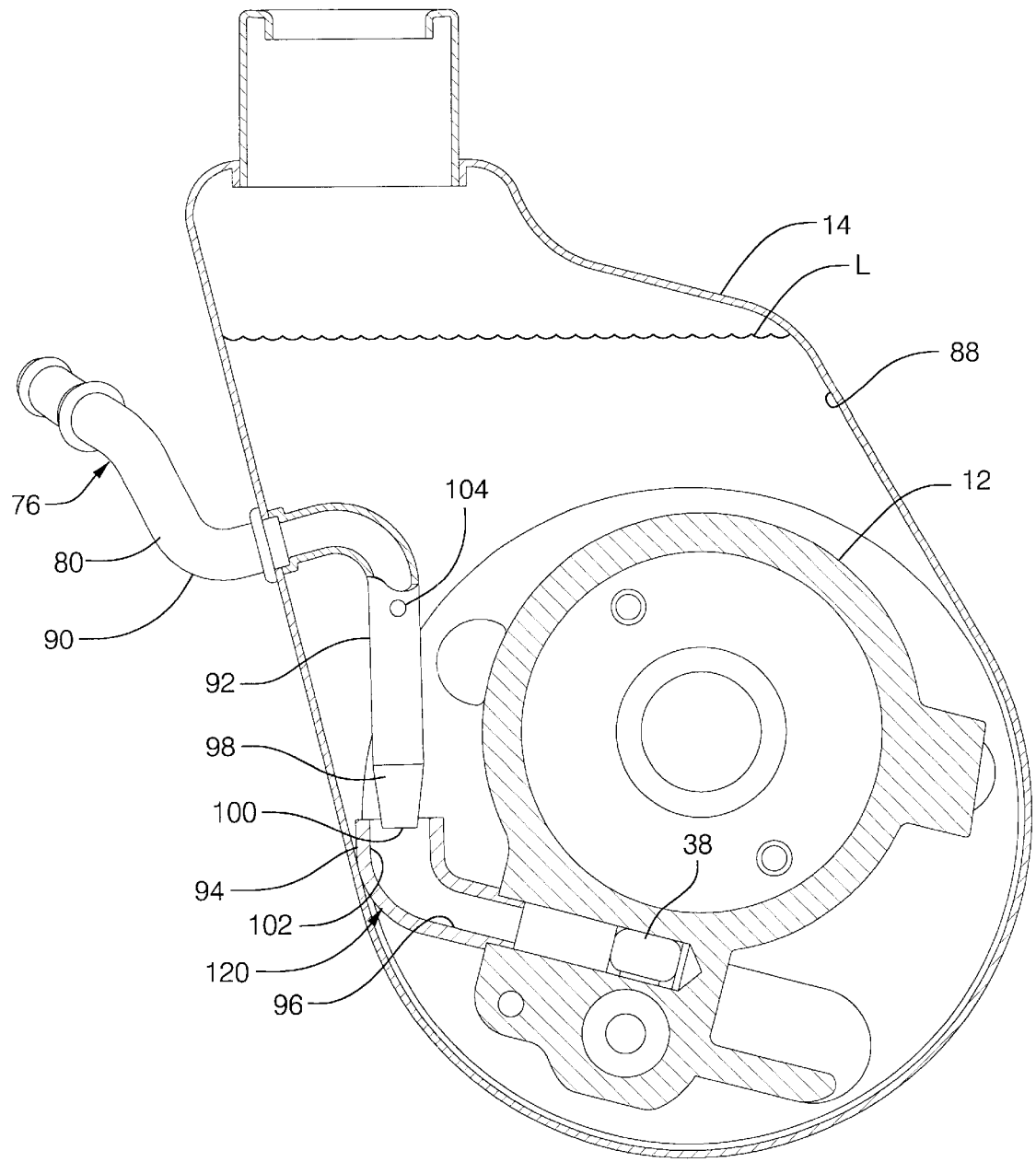
FIG. 11 is a schematic elevation view, shown partly in section, of a pump having an integrated reservoir and a pump inlet fitted with an elbow for communicating with the nozzle.

FIGS. 10 and 11 illustrate yet further embodiments in which the passage 96 of the discharge tube 94 is not entirely coaxial with the nozzle 92. It is thus not essential that the passage 96 of the discharge tube 94 be entirely linear and coaxial with the nozzle. It is permissible to provide a bend or elbow 120 to change the direction of the flow, if necessary, to communicate with the intake 38 of the pump 12.

Figure 12:
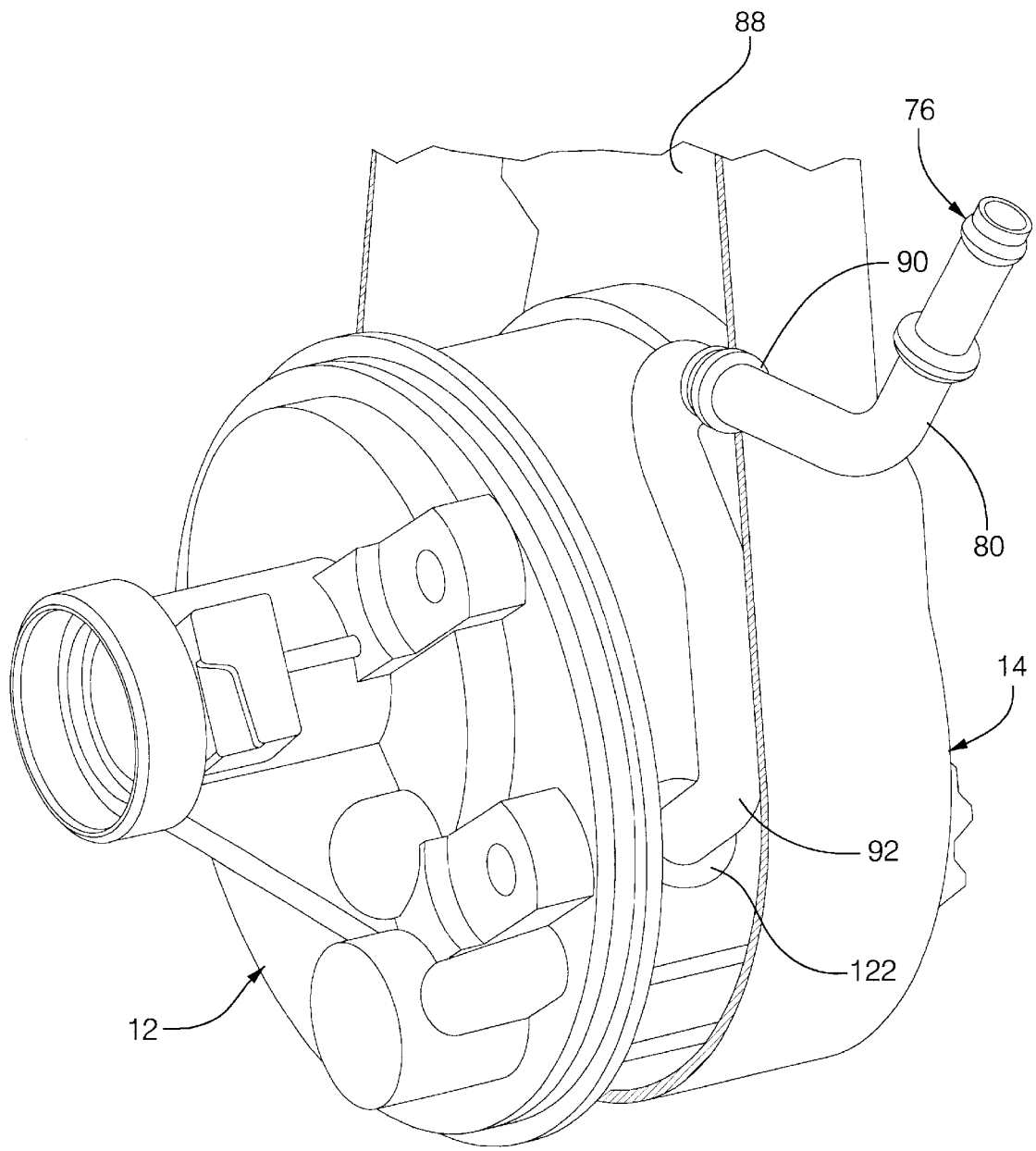
FIG. 12 is a fragmentary perspective view of a pump and integrated booster reservoir according to a further embodiment of the invention.
Figure 13:
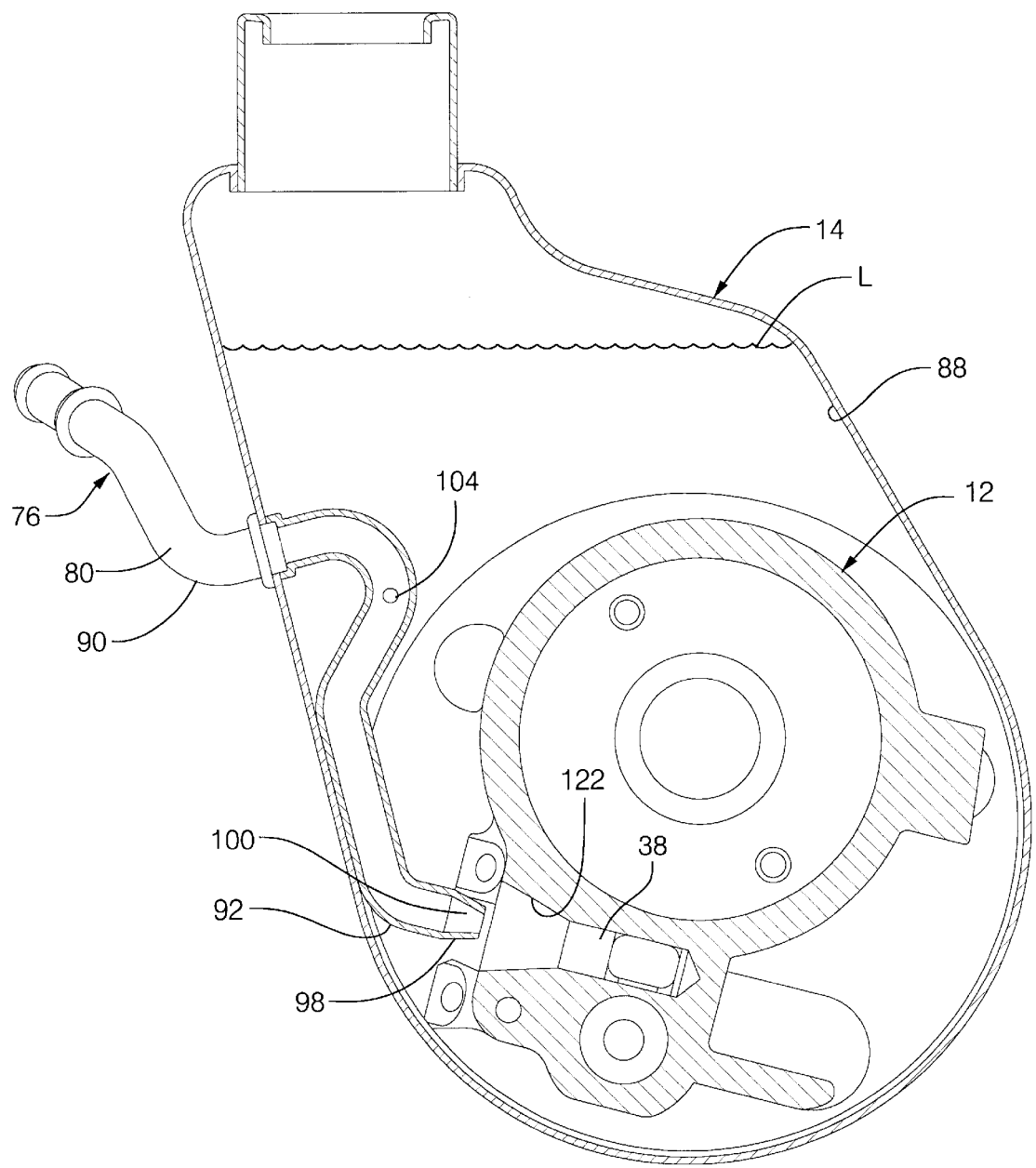
FIG. 13 is a cross-sectional elevational view of an alternative embodiment of a pump.

FIGS. 12 and 13 show a combination pump 12 and reservoir 14 (i.e., integrated) in which the nozzle 92 extends into the chamber 88 and communicates directly with the intake 38 of the pump 12. The intake 38 has a conical mouth 122 to enlarge the target for the nozzle 92. The conical mouth 122 may be cast or machined into the body of the pump 12 as appropriate.

The disclosed embodiments are representative of a presently preferred form of the invention, but is intended to be illustrative rather than definitive thereof. The invention is defined in the claims.

What is claimed is:

1. A hydraulic power system comprising:
   a hydraulic pump having a fluid inlet and a fluid outlet;
   a hydraulic fluid reservoir having an internal chamber for containing a supply of hydraulic fluid, an outlet operatively coupled to said inlet of said pump for communicating fluid from said reservoir to said pump for operating said pump, and an inlet for receiving return fluid into said chamber;
   a fluid return line communicating with said outlet of said pump and with said inlet of said reservoir for returning a high pressure stream of fluid from said pump to said reservoir;
   said fluid return line including a nozzle extending into said chamber through said inlet having a constricted primary discharge opening aligned with said outlet of said reservoir for directing an accelerated jet stream of the hydraulic fluid returned through said return line as said reservoir outlet effecting a venturi action at said reservoir outlet causing additional fluid to be aspirated into said outlet by said jet stream to deliver a boosted feed of the hydraulic fluid to said inlet of said pump; and
   said nozzle including at least one bleed hole within said reservoir upstream of said primary discharge opening operative to discharge a fraction of the returned steam of fluid from said nozzle into said chamber away from said outlet of said reservoir to enable said fraction of said fluid to dwell in said chamber for a time sufficient for natural separation from said fraction of said fluid of entrained gas bubbles before said fluid is aspirated into said outlet by said jet stream.

2. The system of claim 1 including a partition disposed between said primary discharge opening and said bleed hole operative to divert the flow of said fraction of fluid released from said bleed hole away from said outlet of said reservoir.

3. The system of claim 2 wherein said partition is mounted on said reservoir.

4. The system of claim 2 wherein said partition is mounted on said nozzle.

5. The system of claim 2 including bubble coalescing screen adjacent said partition.

6. The system of claim 1 wherein said bleed hole is formed in a side wall of said nozzle.

7. The system of claim 1 wherein said return line comprises the sole source of return fluid into said reservoir.

8. The system of claim 1 wherein said pump and said reservoir are integrated such that said outlet of said reservoir communicated directly with said inlet of said pump.

9. The system of claim 1 wherein said reservoir is remote from said pump and including a fluid line extending between said outlet of said reservoir and said inlet of said pump.

10. The system of claim 1 wherein said pump comprises a power steering pump of an automotive vehicle.

11. A method of controlling the flow of fluid in a closed circuit hydraulic system having a pump with an inlet and an outlet, and a fluid reservoir having an inlet communicating with said outlet of said pump and an outlet communicating with said inlet of said pump, said method comprising:
    fitting the inlet of the reservoir with a nozzle extending into said reservoir to a free end having a constricted primary discharge opening aligned with the outlet of said reservoir;
    directing an accelerated jet stream of the hydraulic fluid from the primary discharge opening at the reservoir outlet effecting a venturi action at the reservoir outlet causing additional fluid to be aspirated into said the by the jet stream to deliver a boosted feed of the hydraulic fluid to the inlet of the pump; and
    providing at least one bleed hole in the nozzle within the reservoir at a location upstream of the primary discharge opening and causing a fraction of the returned steam of fluid passing through the nozzle to escape into the reservoir through the bleed hole and to dwell in the reservoir for a time sufficient for natural separation from the fraction of the fluid of entrained gas bubbles before such fluid is aspirated into the outlet by the jet stream.

12. The method of claim 11 including providing a partition between the primary discharge opening and the bleed hole to divert the flow of fluid from the bleed home from being drawn directly into the discharge opening by the jet stream.

13. The method of claim 12 including passing the fluid which escapes the bleed hole through a screen to coalesce gas bubbles in the fluid.

* * * * *